Figure 1:
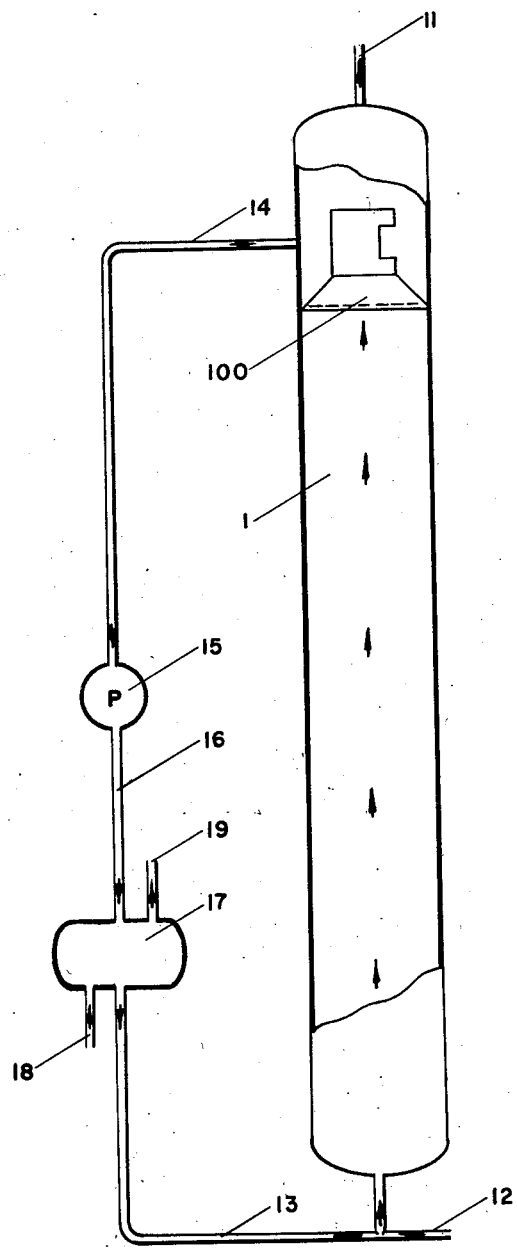

April 23, 1957  R. F. TENNEY ET AL  2,789,888
APPARATUS FOR PERFORMING THE FISCHER-TROPSCH REACTION
Filed March 3, 1953

RALPH F. TENNEY
RUSSELL G. DRESSLER
HERMAN A. REMMERT
INVENTOR.

BY Donald G. Welsh

United States Patent Office 2,789,888
Patented Apr. 23, 1957

2,789,888

APPARATUS FOR PERFORMING THE FISCHER-TROPSCH REACTION

Ralph F. Tenney, Russell G. Dressler, and Herman A. Remmert, Louisiana, Mo., assignors to the United States of America as represented by the Secretary of the Interior Application March 3, 1953, Serial No. 340,174

3 Claims. (Cl. 23—288)

(Granted under Title 35, U. S. Code (1952), sec. 266)

The invention herein described and claimed may be manufactured and used by or for the Government of the United States of America for governmental purposes without the payment of royalties thereon or therefor.

This invention relates to a process and apparatus for performing the Fischer-Tropsch reaction to make synthetic liquid hydrocarbons and chemicals.

An object of the invention is to make provision for retaining the catalyst, used in the process, in the reaction zone for its effective use. By so doing, the catalyst is not circulated through connecting parts of the system intended only for circulating oil, and erosion and excessive wear are prevented.

The Fischer-Tropsch process is well known and is used for the making of synthetic liquid fuels by treatment of carbon monoxide and hydrogen in the presence of catalyst. One modification of carrying out this reaction consists of using a coolant oil along with a granular catalyst in a reaction vessel, through which the synthesis gas, i. e. carbon monoxide and hydrogen mixture, is passed. The coolant oil, which in this case absorbs the exothermic heat of reaction from the synthesis, is made to circulate through a waste heat boiler and give up its heat to the making of steam. The catalyst used may be in the form of particles of reduced iron of 8–20 mesh or thereabouts. This catalyst can be made by the fusion of iron oxides, followed by crushing and segregation to the proper mesh size. The catalyst may be made by procedures identical or similar to that used in the making of iron catalyst for the manufacture of synthetic ammonia.

In the process set forth herein, this catalyst is in a fixed bed or in a bed that is expanded, with the oil passing vertically upward along with the synthesis gas. Thus, we have a system containing three physical phases, i. e. flowing liquid, flowing gas, and a partial suspension of solid catalyst particles. The system is under a gas pressure of 100–600 p. s. i. g. and normally at a temperature of from 500° F. to 625° F.

It is desirable to maintain oil and gas velocities in order to keep the catalyst bed expanded, yet not sufficient to completely entrain the catalyst and circulate it with the oil.

In order to accomplish this, the reactor proposed herein includes a baffle, either removable or constructed as an integral part of the reactor itself. By means of this baffle, the catalyst particles are retained in the reaction zone.

A better understanding of our invention can be had by referring to the accompanying drawing (Fig. 1), which is a schematic representation of the arrangement of the reactor, baffle and circulation system concerned in the practice of this process. Synthesis gas, composed principally of carbon monoxide and hydrogen, enters reactor 1 (see Fig. 1) through line 12. In the Fischer-Tropsch reaction, in the presence of the catalyst, under pressure and temperature conditions these mixed gases react to form hydrocarbons and oxygenated chemicals.

The catalyst consists of, for example, granular, fused iron particles of 8–20 mesh size. Under settled bed conditions, they may fill the reactor to about 75 percent of its volume. Under flow of gas and of coolant oil, the coolant oil entering the reactor through line 13, the catalyst bed is expanded and may occupy 80–85 percent of the reactor volume. The oil entering reactor 1 through line 13 has a duty of removing the heat of reaction liberated by the chemical reaction of carbon monoxide and hydrogen. This oil fills reactor 1 to a height indicated by the level of oil outlet line 14. The oil leaving the reactor through line 14 is recirculated, normally by means of a pump, shown in diagram as 15, discharging from pump 15 through line 16, to a waste heat boiler 17. Line 18 is the feed water inlet to the waste heat boiler and line 19 is the outflow of generated steam. The circulated oil leaving the waste heat boiler by means of line 13, and entering the reactor, is cooled sufficiently to maintain a constant temperature of the reactor contents. Unreacted carbon monoxide and hydrogen, and vaporized products and residual gases, after discharging from the oil, may leave the reactor through line 11.

In the practice of this process, there is a tendency for the catalyst particles to overflow with the oil through line 4 and follow the oil circuit. This causes erosion of the lines and both moving and stationary parts of the pumps, etc. To prevent this, baffle 100 is installed in the top of the reactor. The baffle is an essential feature of this mechanical and process system. Baffle 100 is constructed as a truncated cone with chimney. One form of this is shown in detail in Fig. 2, and an alternate installation is shown in Fig. 3.

Figure 2:
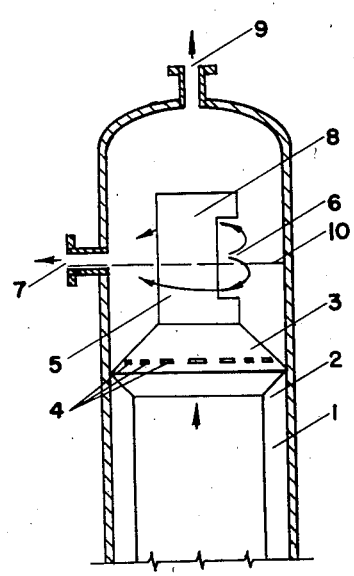

Referring to Fig. 2, a case is illustrated where the reactor 1 is straight-sided and has a constricting liner 2 for most of its length except at the top of the reactor. This results in a reaction chamber with an enlarged top, which is an aid in the settling of catalyst. The baffle is represented jointly by 3 and 5, 3 being the truncated cone section and 5 being the chimney section. The chimney is cut out partially, as shown by 6. The top of the chimney 8 may be open or closed, as required. 7 is the side outlet for oil flow. 9 is the top outlet for gas and vaporous products. The arrows in the vicinity of cut-out section 6 show the direction of flow of the oil through the annular space between the chimney and the inner walls of the reactor 1. The slots at the bottom of the truncated cone section 3 have a series of openings 4 through which catalyst which is dropped out of suspension from the oil can return by gravity to the reaction zone in the lower part of the reactor.

Figure 3:
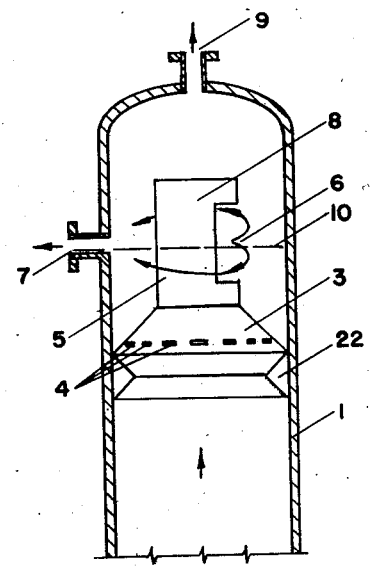

Fig. 3 represents a straight-sided, vertical reactor 1 without liner. It has a baffle of which the lower skirt section is represented by 3 and the chimney by 5 and the cut-out section by 6 and the top, either open or closed, by 8. Near the bottom of the skirt is a series of slots 4. Below the skirt is an inwardly converging V-shaped ring 22. The function of the ring is to deflect the upward oil and gas flow away from the slots, to prevent interference with the downward return of catalyst through the slots. Oil outlet is shown by 7 and the gas outlet by 9. In operation, the oil and gas enter at the bottom of the reactor and flow upward through the inside of the skirt cone 3 and into the chimney 5 and out through the cut-out section 6. The path of oil flow is divided and flows horizontally in the annular space between chimney and reactor, therein reversing its direction of flow, and flowing out at 7. Gas and vaporous products are separated in 5 and flow out either through 8 and 9, or alternately through 7, to be separated from the oil stream later. Oil level is designated by 10. The oil in leaving cut-out section 6 and reversing its flow traverses a relatively quiescent zone where any suspended solids, i. e., catalyst, will drop from suspension, pass through slots 4, and be returned to the reaction zone. Thus, the effluent oil leaving the reactor at 7 is free of solids.

The baffle is an important feature of the apparatus and process. It has several functions. One of these is to separate whole or broken catalyst particles from the coolant oil stream. In this way only very finely divided catalyst particles, say 100-mesh or smaller, leave the reactor in the circulating oil stream. The separation is accomplished by the change in direction of oil flow inside the baffle from vertical to horizontal and by a reversal of flow direction when the oil passes the cut-out section of the baffle. The chimney section of the baffle is preferably built relatively small in diameter, as compared with the inside diameter of the reactor proper, in order to allow a large annular cross-sectional area between baffle and reactor. This accomplishes a reduced velocity of flow of the oil and facilitates settling of catalyst particles. A liquid level is maintained to coincide with some point on the cut-out section of the baffle in order to circumvent turbulence and splashing. The baffle thus aids in the separation of gas and vaporous products from the liquid and also of solid particles from the liquid.

The catalyst used in the process can be of the promoted fused-iron type, similar to that commonly used in the synthesis of ammonia. This catalyst, when of 8–20 mesh particle size, has a bulk density of 110 pounds per cubic foot. In the process, generally a selected size of catalyst particles, i. e., 8–20 mesh, 20–40 mesh, 4–10 mesh, etc., is used. The selection of the size of catalyst for any case will depend on the density of the catalyst particles, their shape, and the viscosities and velocities of synthesis gas and coolant oil used, as all of the above factors are related to the settling rate of solid particles.

*Example*

In order to test the efficiency of the baffle for the separation of suspended solid particles, a test was made with and without the baffle installed. The reactor used was of 6-foot inside diameter, with a liner installed in all but the top section, making the bore 3-foot inside diameter and the top 6-foot inside diameter. The reactor was constructed similar to that shown in Fig. 2. The skirt section of the baffle was 17 inches high and the chimney section was 42 inches high and 30 inches in diameter, with a cut-out section 23 inches high and 24 inches wide, measured as a chord on the diameter of the chimney. Attempt was made to stimulate actual operating conditions by using water as the coolant medium to represent oil. Gas flow was set at 90,000 std. C. F. H., and the catalyst used was a fused iron Fischer-Tropsch catalyst of 8–20 mesh. The water flow through the reactor, without baffle, was set at 250 G. P. M. With this rate of water and gas flow, the effluent from the reactor carried about 90 grams of catalyst per gallon. After the baffle was installed, at rates of 90,000 std. C. F. H. gas and first at 250 G. P. M. and later at 350 G. P. M. of water, there was no detectable amount of catalyst in the effluent water. At a flow rate of 90,000 std. C. F. H. gas and 500 G. P. M. of water, there was catalyst in the effluent water amounting to one-fourth of a gram per gallon of water. None of the catalyst particles were of full size, i. e., 8–20 mesh, but consisted entirely of broken, undersized pieces.

In the carrying out of this process, over a period of time the catalyst may disintegrate to some extent. Due to attrition and chemical action, the catalyst may be reduced from quite finite sized particles originally introduced in the system to particles of 300-mesh size or finer. This finely-divided catalyst has a high activity due to its increased surface and is desirable. Being in a finely divided state, it circulates with the oil in the system. However, the more finite-size grains, due to the baffle arrangement, are separated and do not circulate with the oil. As practiced, this method actually can become a combination of a fixed- or jiggling-bed operation and the so-called slurry circulation-oil operation. The degree depends on the amount of catalyst disintegration which occurs. The efficiency of confining the fixed-bed portion of the operation to its proper zone is dependent on the efficiency of the baffle.

It is to be understood that the above description, together wtih the specific example described, is intended merely to illustrate the invention, and that the invention is not to be limited thereto, nor in any way except by the scope of the appended claims.

We claim:

1. An apparatus for the synthesis of organic compounds by the reaction of gases in the presence of catalysts suspended in a liquid, comprising a substantially vertical cylindrical vessel adapted to contain a suspension of granular catalyst in a liquid medium, a fluid inlet in the lower portion of said vessel, a fluid outlet in the upper portion of said vessel, means adjacent said outlet for separating solids from fluids comprising an inwardly and upwardly sloping baffle ring surmounted by a cylinder extending above the level of said fluid outlet and being provided with an outlet intermediate the top and bottom thereof and diametrically opposite said fluid outlet, whereby an abrupt change in direction is imparted to fluids flowing out of said cylinder to separate entrained solids therefrom.

2. An apparatus for reacting gases in the presence of a catalyst suspended in a liquid medium, comprising a substantially vertical cylindrical reactor adapted to contain a mass of solid discrete particles of catalyst, an inlet for fluids in the lower portion of said reactor, means in the upper portion of said reactor for separating solids from fluids, said means comprising a baffle having a vertically disposed, inwardly sloping, truncated, conical lower section and a substantially cylindrical upper section provided with an opening in the side thereof, and an outlet for fluids in the upper portion of said reactor diametrically opposite said opening in said baffle.

3. An apparatus for reacting gases in the presence of a catalyst suspended in a liquid, comprising a substantially vertical, cylindrical reactor adapted to contain a solid catalyst, an inlet for fluids in the lower portion of said reactor, an internal phase-separator in the upper portion of said reactor, said phase-separator comprising a lower skirt section in the form of an inwardly sloping frustrum of a cone, the lower edge of said cone terminating adjacent the wall of said reactor and being provided with a plurality of apertures whereby solids depositing on said skirt section may pass therethrough, an upper cylindrical section closed at the top and provided with an opening at the side thereof, an inwardly converging V shaped deflector ring adjacent to but below the lower outer edge of said skirt section, an outlet for fluids in the upper portion of said reactor substantially in the plane of the opening in said phase-separator and diametrically opposite said opening, means connected to said outlet for circulating fluids to said inlet in the lower portion of said reactor.

References Cited in the file of this patent

UNITED STATES PATENTS

| | | |
|---|---|---|
| 1,926,563 | Seifer | Sept. 12, 1933 |
| 2,438,029 | Atwell | Mar. 16, 1948 |
| 2,547,190 | Wilson | Apr. 3, 1951 |
| 2,565,343 | Benham | Aug. 21, 1951 |